US005497198A

United States Patent [19]
Kim

[11] Patent Number: 5,497,198
[45] Date of Patent: Mar. 5, 1996

[54] CIRCUIT FOR CONVERTING HDTV SIGNALS INTO CONVENTIONAL TV SIGNALS WITH THE LETTER BOX MODE

[75] Inventor: Kyung S. Kim, Seoul, Rep. of Korea

[73] Assignee: Goldstar Co., Ltd., Rep. of Korea

[21] Appl. No.: 210,175

[22] Filed: Mar. 17, 1994

[30] Foreign Application Priority Data

Mar. 17, 1993 [KR] Rep. of Korea ................... 4091/1993

[51] Int. Cl.⁶ .............................. H04N 7/01; H04N 5/46
[52] U.S. Cl. ........................... 348/445; 348/441; 348/913
[58] Field of Search .................................. 348/445, 441, 348/448, 449, 458, 722, 469, 426, 439, 556, 558, 555, 561, 604, 704, 581, 913; H04N 7/01, 5/46, 5/45

[56] References Cited

U.S. PATENT DOCUMENTS

| | | | |
|---|---|---|---|
| 4,449,143 | 5/1984 | Dischert et al. | 348/445 |
| 5,001,562 | 3/1991 | Tabata et al. | 348/450 |
| 5,029,326 | 7/1991 | Tabata | 348/458 |
| 5,031,040 | 7/1991 | Maruyama | 348/458 |
| 5,045,939 | 9/1991 | Okayama et al. | 348/445 |
| 5,070,395 | 12/1991 | Kitaura et al. | 348/458 |
| 5,168,358 | 12/1992 | Ishizu et al. | 348/443 |
| 5,194,937 | 3/1993 | Lee et al. | 348/458 |
| 5,208,668 | 5/1993 | Dinsel et al. | 348/913 |
| 5,212,550 | 5/1993 | Park | 348/458 |
| 5,218,469 | 6/1993 | Sugiyama et al. | 348/469 |
| 5,231,490 | 7/1993 | Park | 348/445 |
| 5,276,515 | 1/1994 | Katsumata et al. | 348/704 |
| 5,343,238 | 8/1994 | Takata et al. | 348/561 |

FOREIGN PATENT DOCUMENTS 60-165883 8/1985 Japan .......................... H04N 7/01

OTHER PUBLICATIONS

Schreiber, William F., "6–MHz Single–Channel HDTV Signals", HDTV Symposium, Ottawa, Oct. 1987.

Primary Examiner—Victor R. Kostak
Assistant Examiner—Safet Metjahic
Attorney, Agent, or Firm—Ostrolenk, Faber, Gerb & Soffen

[57] ABSTRACT

A high definition television signal conversion circuit using a side cut mode or a letter box mode. The conversion circuit using the side cut mode comprises an A/D converter for converting a high definition television signal into a digital signal at a first sampling frequency, a line filtering circuit for performing a vertical interpolation of the digital signal from the A/D converter, a line decimation circuit for performing a vertical decimation of output data from the line filtering circuit, a horizontal filtering circuit for performing a horizontal interpolation of output data from the line decimation circuit, a horizontal decimation circuit for performing a horizontal decimation of output data from the horizontal filtering circuit, a memory device for storing output data from the horizontal decimation circuit in response to a write clock and outputting the stored data in response to a read clock, the read clock being determined according to a scanning mode, a D/A converter for converting output data from the memory device into an analog signal at a second sampling frequency, the second sampling frequency being determined according to the scanning mode, and a switch being turned on/off according to the scanning mode to control the data output from the memory device.

3 Claims, 15 Drawing Sheets

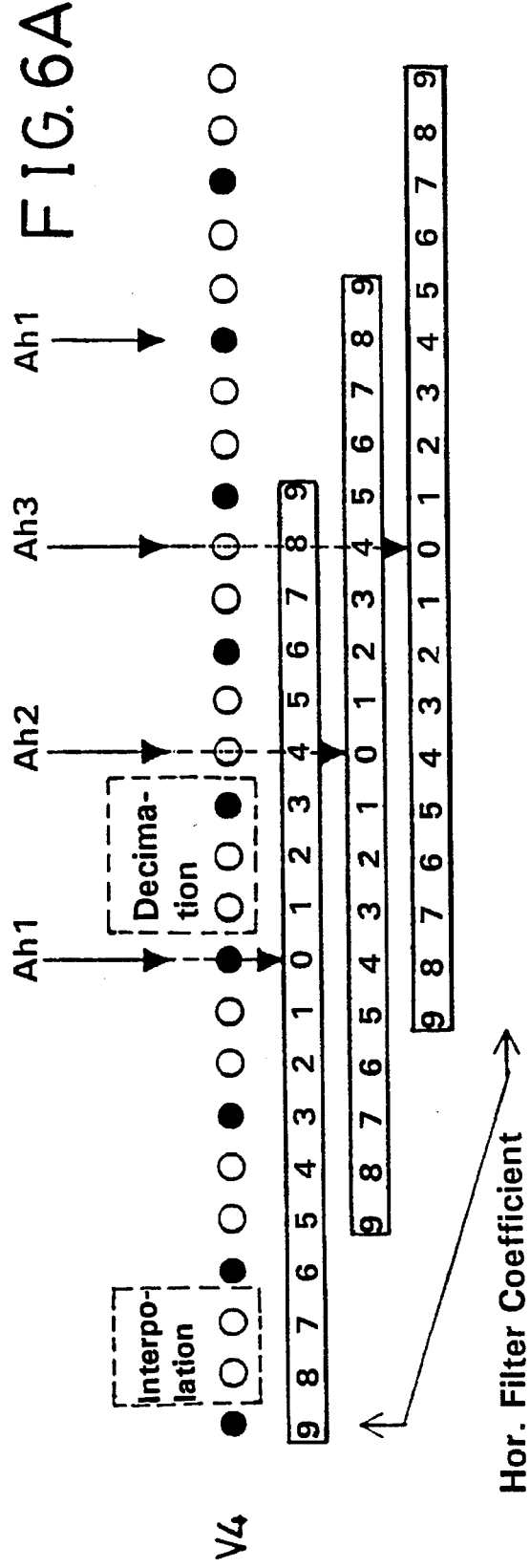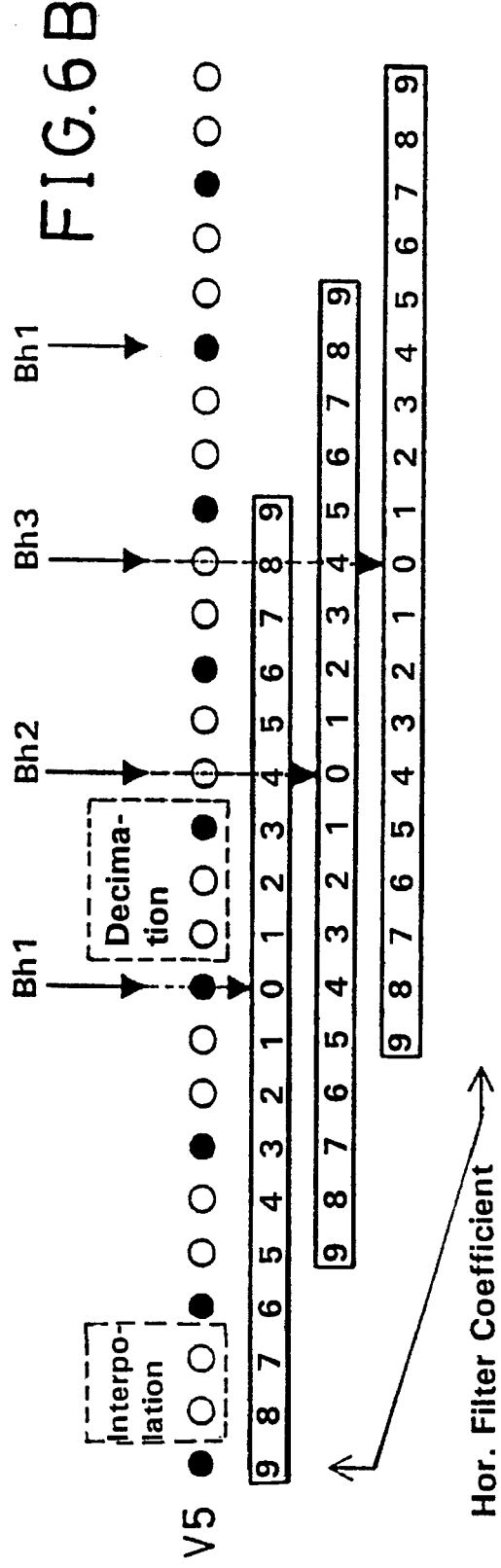

FIG.8
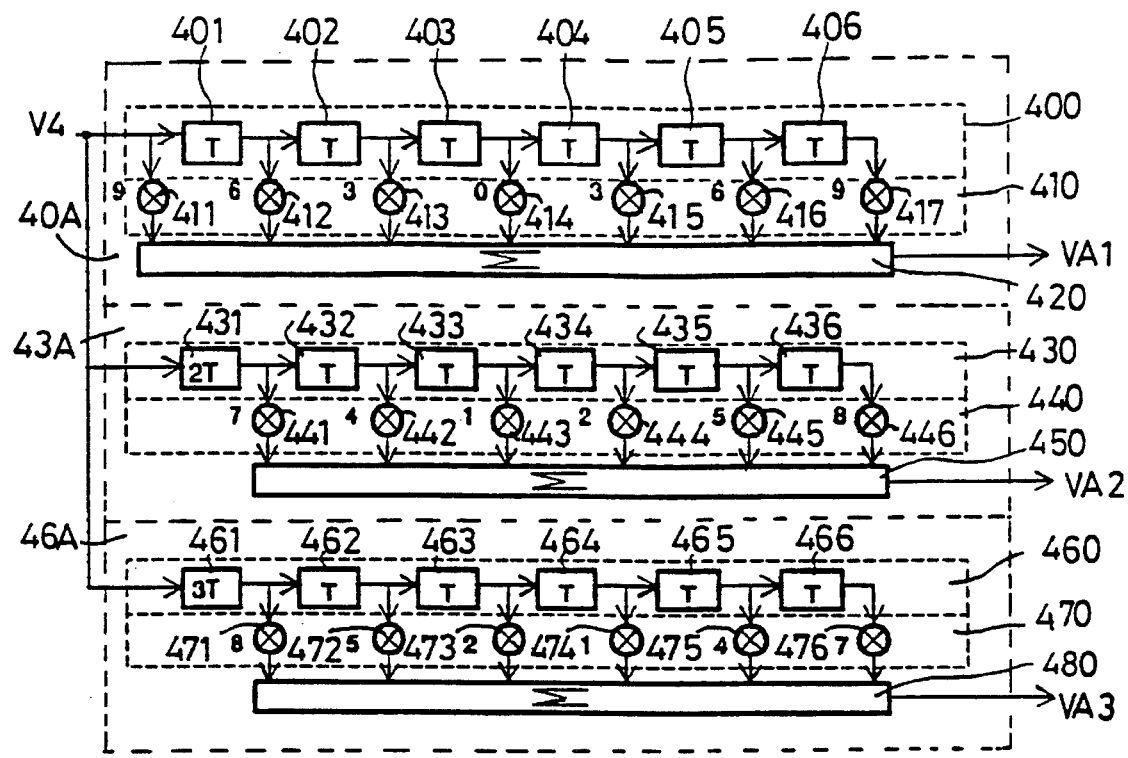
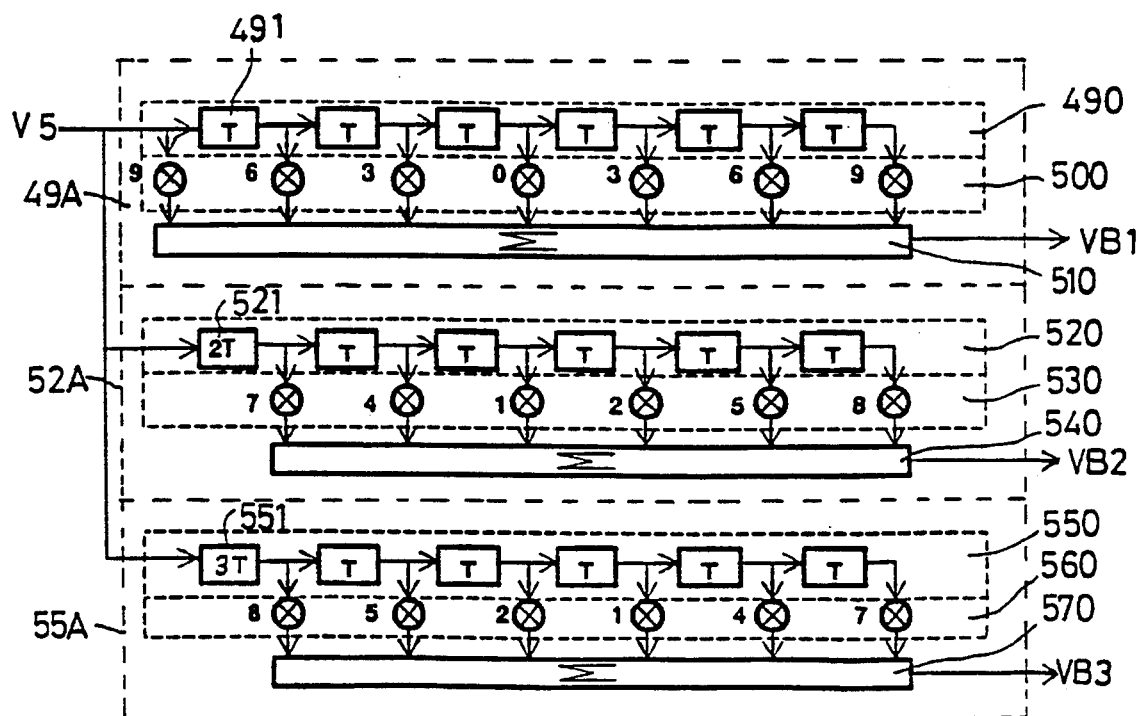

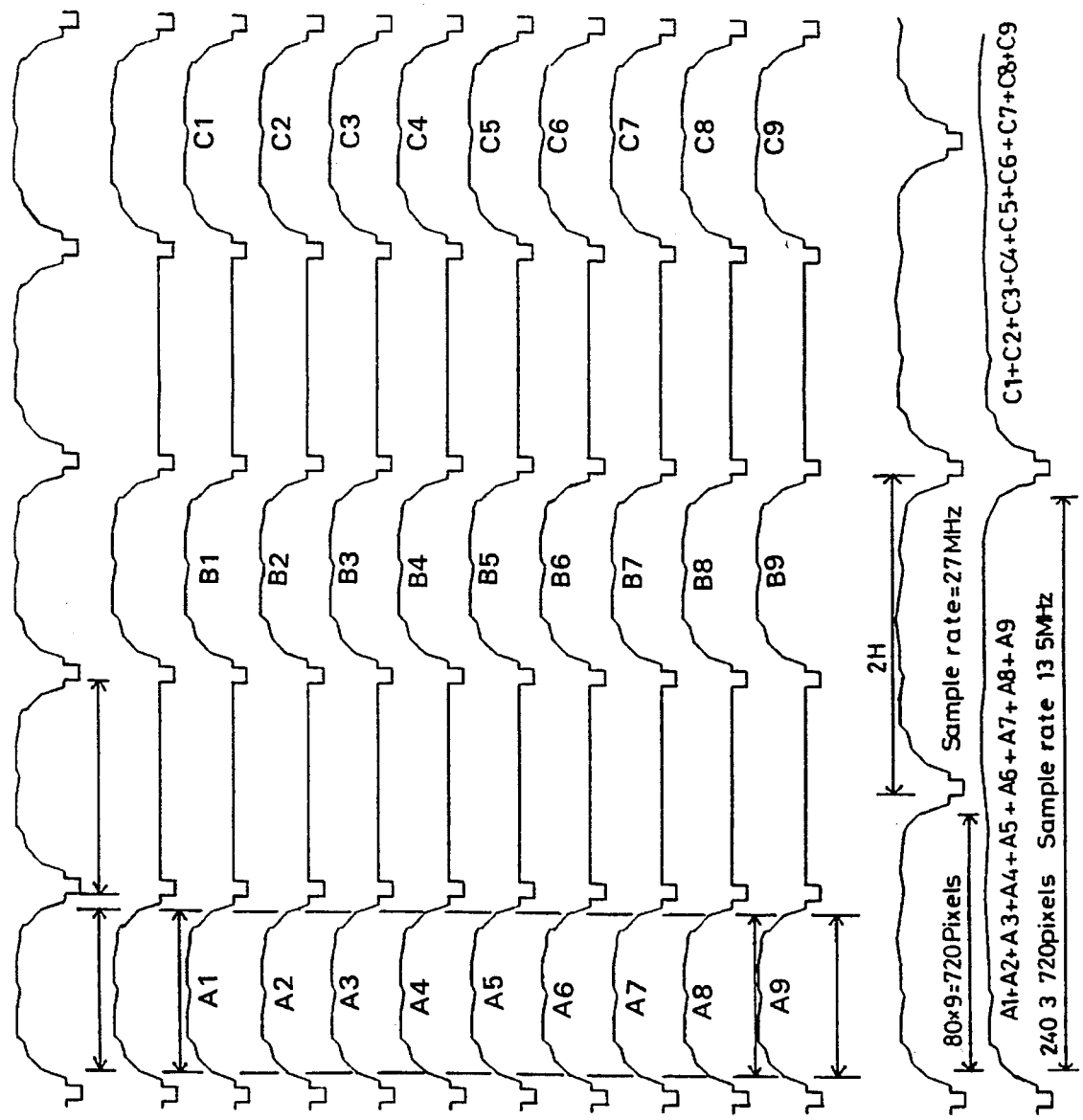

5,497,198

CIRCUIT FOR CONVERTING HDTV SIGNALS INTO CONVENTIONAL TV SIGNALS WITH THE LETTER BOX MODE

BACKGROUND OF THE INVENTION

1. Field of the Invention

The present invention relates in general to high definition television (referred to hereinafter as HDTV) signal conversion circuits, and more particularly to a HDTV signal conversion circuit for converting a HDTV signal into a NTSC broadcasting signal using a side cut mode or a letter box mode.

2. Description of the Prior Art

Generally, a HDTV signal cannot be received by a television receiver capable of receiving a NTSC broadcasting signal. For this reason, the user must separately purchase an expensive HDTV receiver to watch the HDTV signal.

SUMMARY OF THE INVENTION

Therefore, the present invention has been made in view of the above problem, and it is an object of the present invention to provide a HDTV signal conversion circuit for converting a HDTV signal with an aspect ratio of 16:9 into a NTSC broadcasting signal with an aspect ratio of 4:3 or 16:9 so that the HDTV signal can be received by a television receiver capable of receiving the NTSC broadcasting signal.

In accordance with one aspect of the present invention, there is provided a high definition television signal conversion circuit using a side cut mode, comprising analog/digital conversion means for converting a high definition television signal into a digital signal at a first sampling frequency; line filtering means for performing a vertical interpolation of the digital signal from said analog/digital conversion means to estimate and interpolate an unknown line; line decimation means for performing a vertical decimation of output data from said line filtering means to delete lines regularly; horizontal filtering means for performing a horizontal interpolation of output data from said line decimation means to estimate and interpolate an unknown pixel; horizontal decimation means for performing a horizontal decimation of output data from said horizontal filtering means to delete pixels regularly; first memory means for storing output data from said horizontal decimation means in response to a first write clock and outputting the stored data in response to a first read clock, said first read clock being determined according to a scanning mode; first digital/analog conversion means for converting output data from said first memory means into an analog signal at a second sampling frequency, said second sampling frequency being determined according to the scanning mode; and switching means being turned on/off according to the scanning mode to control the data output from said first memory means.

In accordance with another aspect of the present invention, there is provided a high definition television signal conversion circuit using a letter box mode, comprising analog/digital conversion means for converting a high definition television signal into a digital signal at a first sampling frequency; line decimation means for performing a vertical decimation of output data from said analog/digital conversion means according to a scanning mode to delete lines; horizontal filtering means for delaying sequentially output data from said line decimation means to perform a horizontal interpolation of the output data from said line decimation means; horizontal decimation means for performing a horizontal decimation of output data from said horizontal filtering means to delete pixels regularly; first memory means for storing output data from said horizontal decimation means in response to a first write clock and outputting the stored data in response to a first read clock, said first read clock being determined according to the scanning mode; and first digital/analog conversion means for converting output data from said first memory means into an analog signal at a second sampling frequency, said second sampling frequency being determined according to the scanning mode.

BRIEF DESCRIPTION OF THE DRAWINGS

The above and other objects, features and advantages of the present invention will be more clearly understood from the following detailed description taken in conjunction with the accompanying drawings, in which:

FIGS. 6A and 6B are views illustrating states of the input data in FIG. 3 or 4 to which horizontal interpolation and decimation are applied in accordance with the present invention;

FIG. 8 is a detailed block diagram of a horizontal filtering circuit in FIG. 3 or 4;

FIGS. 15A to 15M are waveform diagrams of output data from components in FIG. 11.

DETAILED DESCRIPTION OF THE PREFERRED EMBODIMENTS

A main feature of the present invention is to convert a HDTV signal of the Zenith type into a NTSC broadcasting signal of the CCIR 601-1 standard.

First, the conversion of an aspect ratio of the HDTV signal into that of the NTSC broadcasting signal using a side cut mode in accordance with the present invention will hereinafter be described.

Referring to FIG. 8, there is shown a block diagram of an embodiment of a HDTV signal conversion circuit using the side cut mode in accordance with the present invention. As shown in this drawing, the HDTV signal conversion circuit comprises an analog/digital (A/D) converter 1A for converting the HDTV signal into a digital signal V1 at a sampling frequency Vf1 (4788fh), a line filtering circuit 2A for performing a vertical interpolation of the digital signal V1 from the A/D converter 1A, a line decimation circuit 3A for performing a vertical decimation of output data V2 and V3 from the line filtering circuit 2A, a horizontal filtering circuit 4A for performing a horizontal interpolation of output data V4 and V5 from the line decimation circuit 3A, and a horizontal decimation circuit 6A for performing a horizontal decimation of output data VA1–VA3 and VB1–VB3 from the horizontal filtering circuit 4A.

A memory device 7A is provided in the HDTV signal conversion circuit to store output data AH1–AH3 and BH1–BH3 from the horizontal decimation circuit 6A in response to a write clock WCLK1 and output the stored data in response to a read clock RCLK1.

A switch SW1 is adapted to be turned on/off according to interlace and non-interlace modes.

A digital/analog (D/A) converter 8A is also provided in the HDTV signal conversion circuit to convert output data V6–V11 from the memory device 7A into an analog signal at a sampling frequency Vf2.

Figure 3:
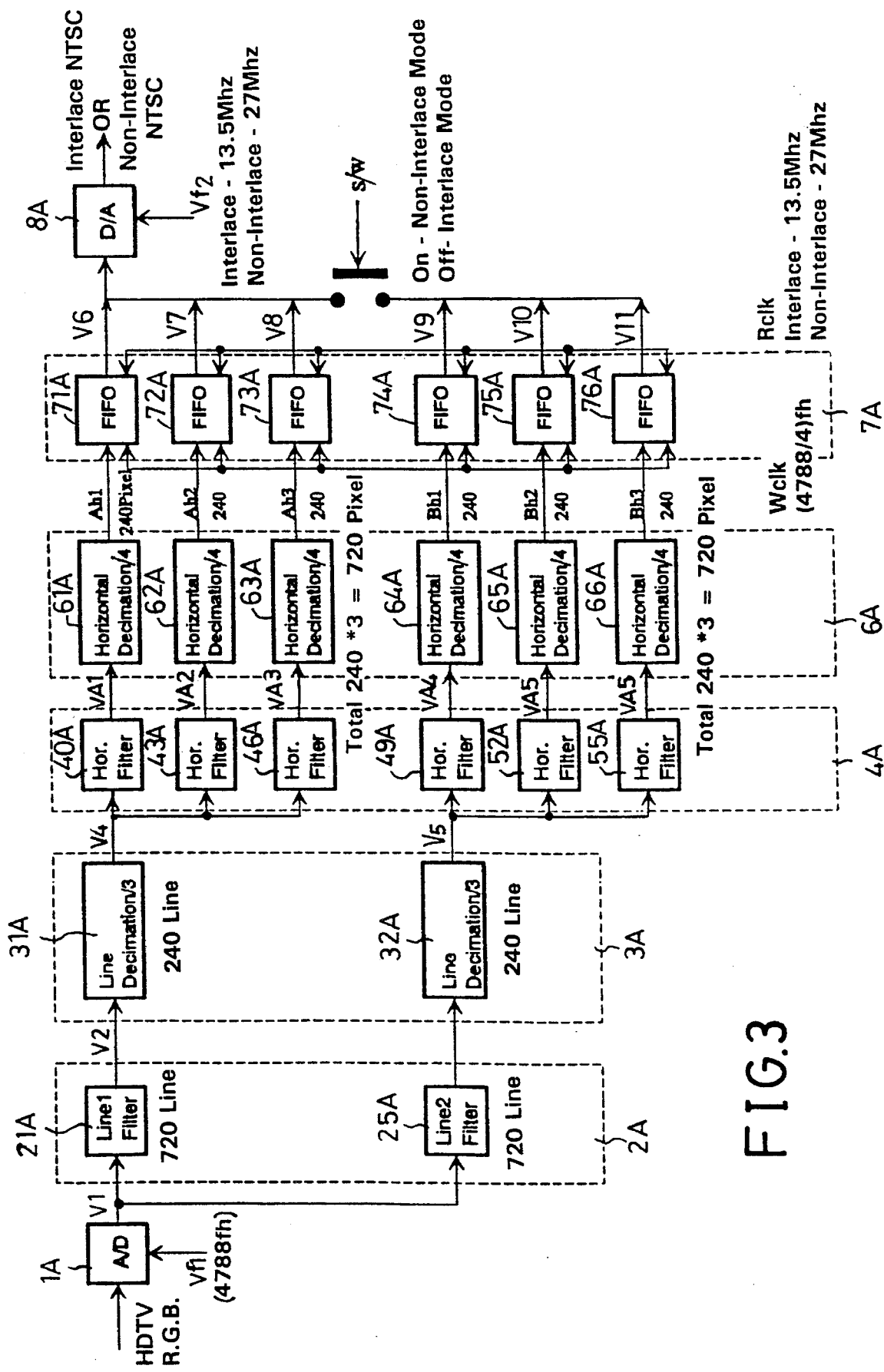
FIG. 3 is a block diagram of an embodiment of a HDTV signal conversion circuit using the side cut mode in accordance with the present invention.
Figure 7:
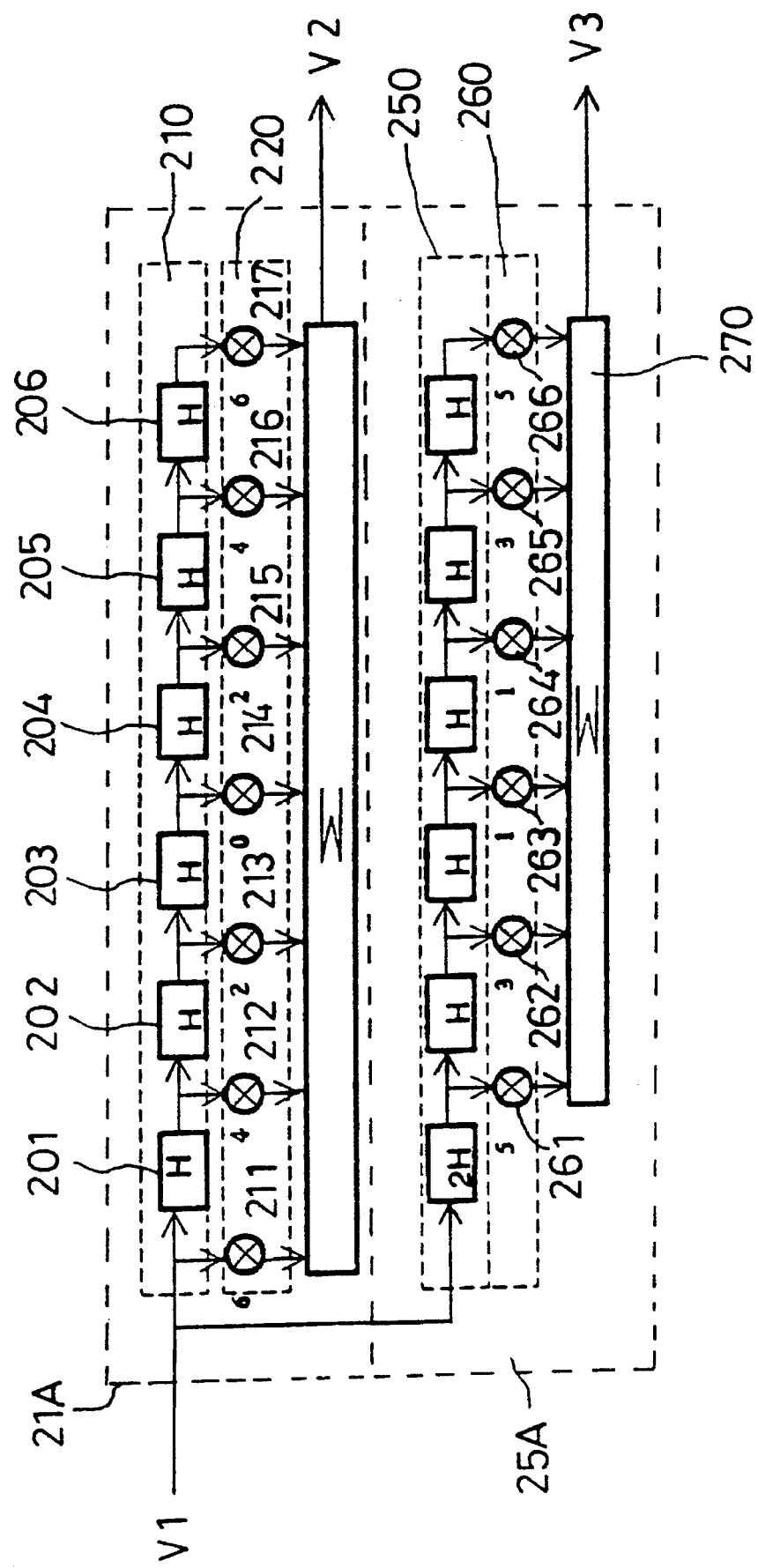
FIG. 7 is a detailed block diagram of a line filtering circuit in FIG. 3 or 4.
Figure 9:
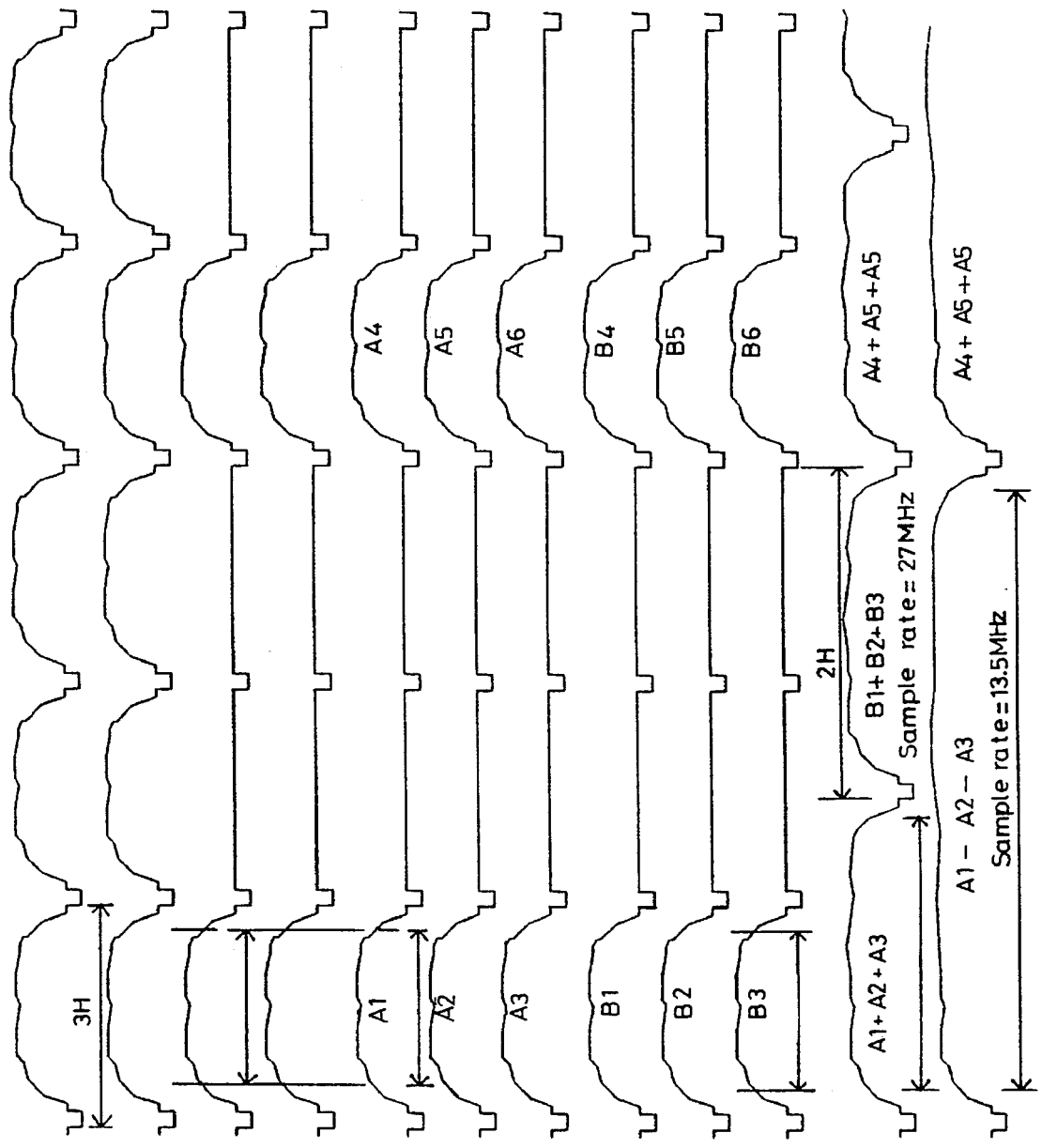
FIGS. 9A to 9L are waveform diagrams of output data from components in FIG. 3.

Referring to FIG. 7, there is shown a detailed block diagram of the line filtering circuit 2A in FIG. 3. As shown in this drawing, the line filtering circuit 2A includes line filters 21A and 25A.

The line filter 21A includes a line delay circuit 210, a multiplication circuit 220 and an adder 230. The line delay circuit 210 includes a plurality of delay elements 201–206 for sequentially delaying the digital signal V1 from the A/D converter 1A by 1 H. The multiplication circuit 220 is provided with a plurality of multipliers 211–217, each of which multiplies a corresponding one of the digital signal V1 from the A/D converter 1A and output data from the delay elements 201–206 in the line delay circuit 210 by a coefficient. The adder 230 is adapted to add output data from the multipliers 211–217 in the multiplication circuit 220.

The line filter 25A includes a line delay circuit 250, a multiplication circuit 260 and an adder 270, similarly to those in the line filter 21A. The line delay circuit 250 has the same construction as that of the line delay circuit 210 in the line filter 21A, with the exception that a 2 H delay element 251 is substituted for the 1 H delay element 201 in the line delay circuit 210. Also, the multiplication circuit 260 has the same construction as that of the multiplication circuit 220 in the line filter 21A, with the exception that it has no multiplier corresponding to the multiplier 211 in the multiplication circuit 220. The adder 270 has the same function as that of the adder 230 in the line filter 21A.

Referring to FIG. 8, there is shown a detailed block diagram of the horizontal filtering circuit 4A in FIG. 3. As shown in this drawing, the horizontal filtering circuit 4A includes three horizontal filters 40A, 43A and 46A for filtering the output data V4 from a decimation unit 31A in the line decimation circuit 3A, and three horizontal filters 49A, 52A and 55A for filtering the output data V5 from a decimation unit 32A in the line decimation circuit 3A.

The horizontal filter 40A includes a pixel delay circuit 400, a multiplication circuit 410 and an adder 420. The pixel delay circuit 400 includes a plurality of delay elements 401–406 for sequentially delaying the output data V4 from the decimation unit 31A by one pixel. The multiplication circuit 410 is provided with a plurality of multipliers 411–417, each of which multiplies a corresponding one of the output data V4 from the decimation unit 81A and output data from the delay elements 401–406 in the pixel delay circuit 400 by a coefficient. The adder 420 is adapted to add output data from the multipliers 411–417 in the multiplication circuit 410.

The horizontal filters 43A and 46A include pixel delay circuits 430 and 460, multiplication circuits 440 and 470 and adders 450 and 480, respectively, similarly to those in the horizontal filter 40A. In the horizontal filter 43A, the pixel delay circuit 430 has the same construction as that of the pixel delay circuit 400 in the horizontal filter 40A, with the exception that a two-pixel delay element 431 is substituted for the one-pixel delay element 401 in the pixel delay circuit 400. Also, the multiplication circuit 440 has the same construction as that of the multiplication circuit 410 in the horizontal filter 40A, with the exception that it has no multiplier corresponding to the multiplier 411 in the multiplication circuit 410. The adder 450 has the same function as that of the adder 420 in the horizontal filter 40A. Similarly, in the horizontal filter 46A, the pixel delay circuit 460 has the same construction as that of the pixel delay circuit 400 in the horizontal filter 40A, with the exception that a three-pixel delay element 461 is substituted for the one-pixel delay element 401 in the pixel delay circuit 400. Also, the multiplication circuit 470 has the same construction as that of the multiplication circuit 410 in the horizontal filter 40A, with the exception that it has no multiplier corresponding to the multiplier 411 in the multiplication circuit 410. The adder 480 has the same function as that of the adder 420 in the horizontal filter 40A.

Also, the horizontal filter 49A includes a pixel delay circuit 490, a multiplication circuit 500 and an adder 510, in the same manner as those of the horizontal filter 40A. The horizontal filter 52A includes a pixel delay circuit 520, a multiplication circuit 530 and an adder 540, in the same manner as those of the horizontal filter 43A. The horizontal filter 55A includes a pixel delay circuit 550, a multiplication circuit 530 and an adder 570, in the same manner as those of the horizontal filter 46A.

On the other hand, the sampling frequency Vf1 for the A/D converter 1A is 4788fh, which is specified by Zenith. Here, fh is a NTSC horizontal frequency.

For illustrative purposes, the construction of FIG. 3 is provided to process the HDTV signal (R, G and B) of one channel. Therefore, a description will herein be made only with respect to one channel.

Figure 1:
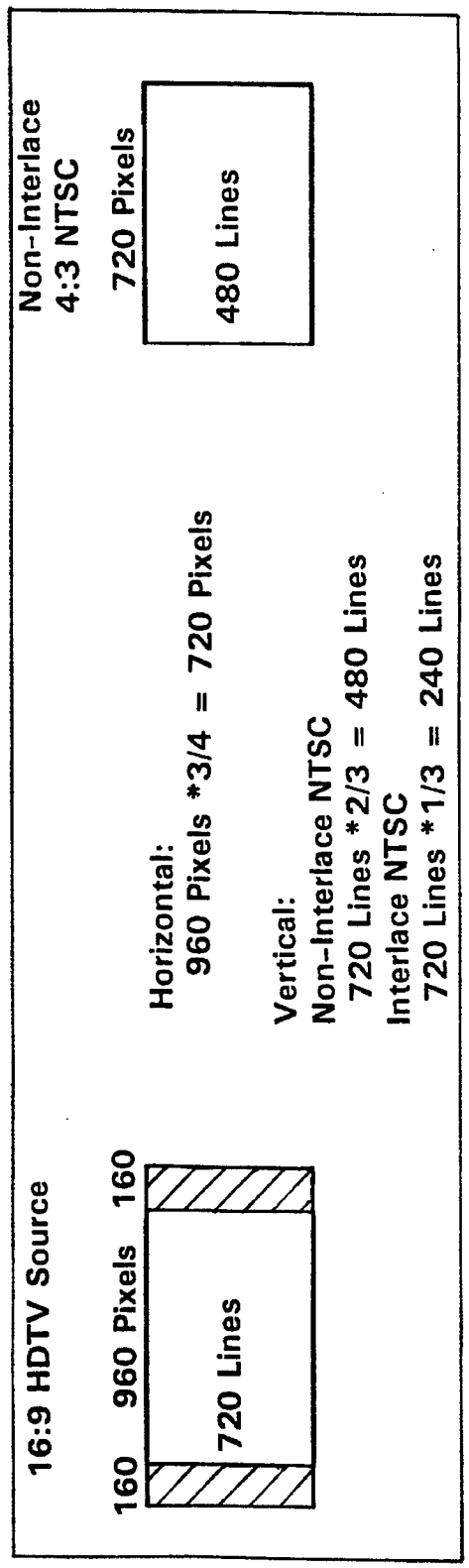
FIG. 1 is a view illustrating a screen state to which a side cut mode is applied in accordance with the present invention.
Figure 5:
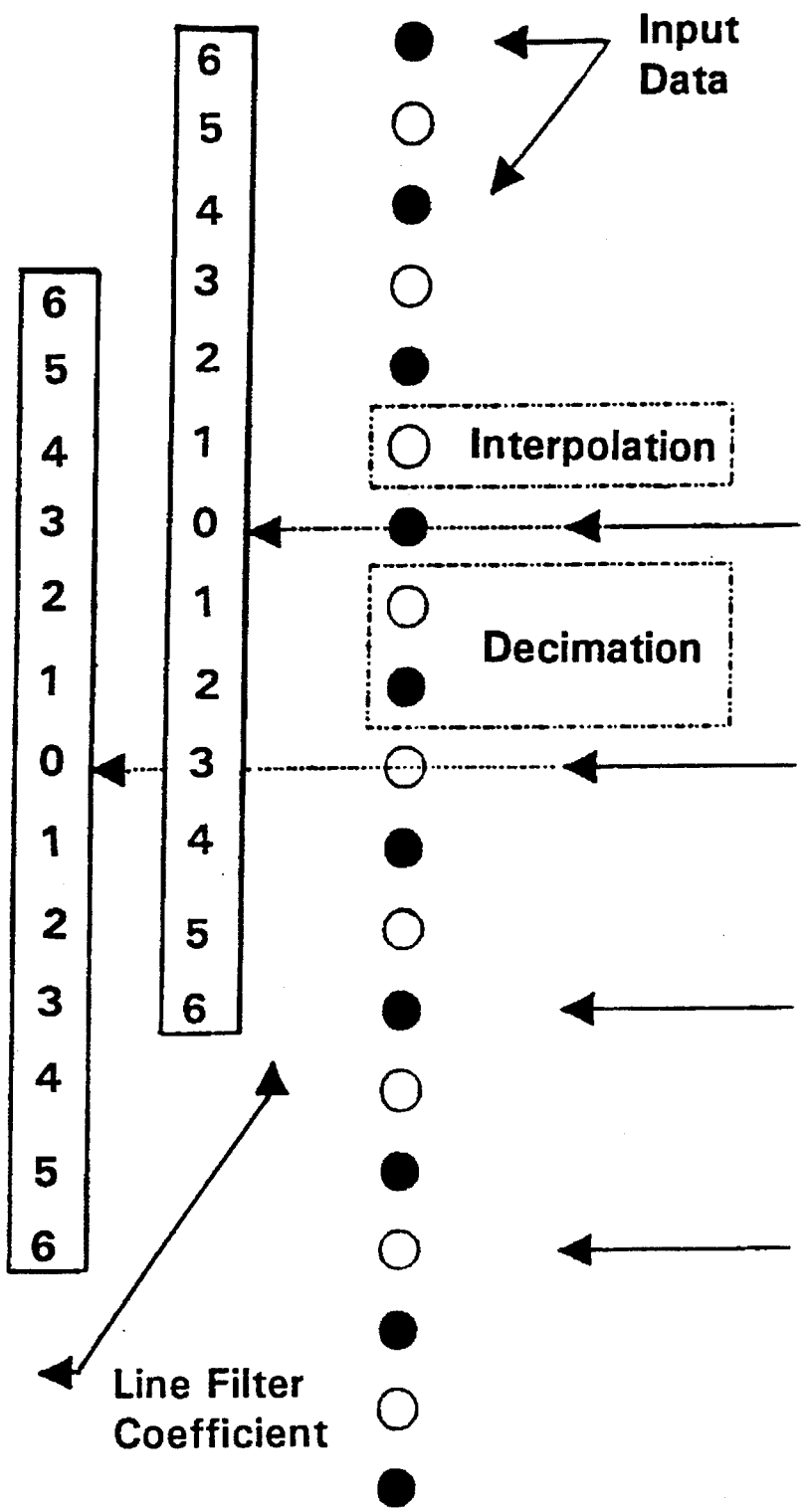
FIG. 5 is a view illustrating a state of input data in FIG. 3 or 4 to which vertical interpolation and decimation are applied in accordance with the present invention.

The operation of the embodiment of the HDTV signal conversion circuit with the above-mentioned construction using the side cut mode in accordance with the present invention will hereinafter be described in detail with reference to FIGS. 1, 3 and 5 to 9L. FIG. 1 is a view illustrating a screen state to which the side cut mode is applied in accordance with the present invention, FIG. 5 is a view illustrating a state of the input data in FIG. 3 to which the vertical interpolation and decimation are applied in accordance with the present invention, FIGS. 6A and 6B are views illustrating states of the input data in FIG. 3 to which the horizontal interpolation and decimation are applied in accordance with the present invention, and FIGS. 9A to 9L are waveform diagrams of the output data from the components in FIG. 3.

As shown in FIG. 1, in the HDTV signal of the Zenith type, the number of horizontal active pixels is 1280 and the number of vertical active lines is 720.

In the NTSC broadcasting signal of the CCIR 601-1 standard, the number of horizontal active pixels is 720 and the number of vertical active lines is 480, in the case of the non-interlace mode.

Therefore, for the purpose of the conversion of the HDTV signal with an aspect ratio of 16:9 into the NTSC broadcasting signal with an aspect ratio of 4:3, there is required only a 4:3 aspect ratio portion of the HDTV signal with the aspect ratio of 16:9. Namely, 960 of the 1280 horizontal pixels and the 720 vertical lines of the HDTV signal are required.

In order to convert the HDTV signal with the horizontal 960 pixels into the NTSC broadcasting signal, the horizontal interpolation of 3 and the decimation of 4 are performed with respect to the 960 horizontal pixels.

Also, in order to convert the HDTV signal with the 720 vertical lines into the NTSC broadcasting signal in the non-interlace mode, the vertical interpolation of 2 and the decimation of 2 are performed with respect to the 720 vertical lines. In this case, the converted NTSC broadcasting signal has 480 vertical lines. In the interlace mode, the decimation of 3 are performed with respect to the 720 vertical lines. In this case, the converted NTSC broadcasting signal has 240 vertical lines.

Now, the conversion of the HDTV signal with the aspect ratio of 16:9 into the non-interlace type of NTSC broadcasting signal with the aspect ratio of 4:3 using the side cut mode will be described in detail.

Upon receiving the HDTV signal, the A/D converter 1A converts the received HDTV signal into the digital signal V1 at the sampling frequency Vf1 of 4788fh (fh is the NTSC horizontal frequency). The digital signal V1 from the A/D converter 1A is applied to the line filtering circuit 2A. In the line filtering circuit 2A, the vertical interpolation of 2 is performed with respect to the digital signal V1 from the A/D converter 1A by the line filters 21A and 25A. As a result, each of the output data V2 and V3 from the line filters 21A and 25A has an interval of 3 H as shown in FIGS. 9A and 9B. The output data V2 and V3 from the line filters 21A and 25A are applied to the line decimation circuit 3A.

In more detail, in the line filter 21A of the line filtering circuit 2A, the output data V1 from the A/D converter 1A is sequentially delayed by 1 H by the delay elements 201–206 of the line delay circuit 210. Then, the output data V1 from the A/D converter 1A and the output data from the delay elements 201–206 in the line delay circuit 210 are multiplied by the coefficients (6, 4, 2, 0, 2, 4 and 6) by the multipliers 211–217 in the multiplication circuit 220, respectively. The adder 230 adds the output data from the multipliers 211–217 in the multiplication circuit 220 and outputs the resultant data V2 as shown in FIG. 9A.

Also, in the line filter 25A of the line filtering circuit 2A, the output data V1 from the A/D converter 1A is delayed by 2 H by the delay element 251 in the line delay circuit 250 and then sequentially delayed by 1 H by the delay elements 252–256 in the line delay circuit 250. Then, the output data from the delay elements 251–256 in the line delay circuit 250 are multiplied by the coefficients (5, 3, 1, 1, 3 and 5) by the multipliers 261–266 in the multiplication circuit 260, respectively. The adder 270 adds the output data from the multipliers 261–266 in the multiplication circuit 260 and outputs the resultant data V3 as shown in FIG. 9B.

In the line decimation circuit 3A, the decimation of 3 is performed with respect to the output data V2 and V3 from the line filtering circuit 2A by the line decimation units 31A and 32A. As a result, the output data V4 and V5 from the line decimation units 31A and 32A have 240 lines as shown in FIGS. 9C and 9D, respectively. The output data V4 and V5 from the line decimation units 31A and 32A are applied to the horizontal filtering circuit 4A.

As an example, a case where a tag is 13 will hereinafter be described with reference to FIG. 5 In FIG. 5, the data V1 is designated by black dots. A white dot is produced between the adjacent black dots by performing the interpolation of 2. The coefficients multiplied by the multiplication circuit 220 in the line filter 21A are 6, 4, 2, 0, 2, 4 and 6, and the coefficients multiplied by the multiplication circuit 260 in the line filter 25A are 5, 3, 1, 1, 3 and 5. The output data from the multiplication circuits 220 and 260 are added, respectively, and then outputted as the data V2 and V3, respectively. Then, the decimation of 3 is performed with respect to the output data V2 and V3 from the line filters 21A and 25A by the line decimation units 31A and 32A. Here, the coefficients of the line filters 21A and 25A may be varied according to a requirement in design.

The horizontal interpolation is performed with respect to the output data V4 and V5 of the vertical 240 lines from the line decimation circuit 3A by the horizontal filters 40A, 43A, 46A, 49A, 52A and 55A in the horizontal filtering circuit 4A. As shown in FIG. 8, the output data V4 from the line decimation unit 31A in the line decimation circuit 3A is applied to the horizontal filters 40A, 43A and 46A and the output data V5 from the line decimation unit 32A in the line decimation circuit 3A is applied to the horizontal filters 49A, 52A and 55A.

In the horizontal filter 40A, the output data V4 from the line decimation unit 31A is sequentially delayed by one pixel by the delay elements 401–406 of the pixel delay circuit 400. Then, the output data V4 from the line decimation unit 31A and the output data from the delay elements 401–406 in the pixel delay circuit 400 are multiplied by the coefficients by the multipliers 411–417 in the multiplication circuit 410, respectively. The adder 420 adds the output data from the multipliers 411–417 in the multiplication circuit 410 and outputs the resultant data VA1.

In the horizontal filter 43A, the output data V4 from the line decimation unit 31A is delayed by two pixels by the delay element 431 in the pixel delay circuit 430 and then sequentially delayed by one pixel by the delay elements 432–436 in the pixel delay circuit 430. Then, the output data from the delay elements 431–436 in the pixel delay circuit 430 are multiplied by the coefficients by the multipliers 441–446 in the multiplication circuit 440, respectively. The adder 450 adds the output data From the multipliers 441–446 in the multiplication circuit 440 and outputs the resultant data VA2.

In the horizontal filter 46A, the output data V4 From the line decimation unit 31A is delayed by three pixels by the delay element 461 in the pixel delay circuit 460 and then sequentially delayed by one pixel by the delay elements 462–466 in the pixel delay circuit 460. Then, the output data From the delay elements 461–466 in the pixel delay circuit 460 are multiplied by the coefficients by the multipliers 471–476 in the multiplication circuit 470, respectively. The adder 480 adds the output data from the multipliers 471–476 in the multiplication circuit 470 and outputs the resultant data VA3.

In the same manner as those in the horizontal filters 40A, 43A and 46A, the horizontal filters 49A, 52A and 55A perform the horizontal interpolation of the output data V5 from the line decimation unit 32A and then output the resultant data VB1–VB3, respectively. The output data VA1–VA3 and VB1–VB3 from the horizontal filters 40A, 43A, 46A, 49A, 52A and 55A are applied to the horizontal decimation circuit 6A.

In the horizontal decimation circuit 6A, the decimation is performed with respect to the output data VA1–VA3 and VB1–VB3 from the horizontal filtering circuit 4A by horizontal decimation units 61A–66A. As a result of the decimation, the horizontal decimation units 61A–66A output the data AH1–AH3 and BH1–BH3 as shown in FIGS. 9E to 9J to the memory device 7A.

As an example, a case where a tag is 19 will hereinafter be described with reference to FIGS. 6A and 6B. In FIG. 6A, the 19 coefficients of the horizontal filters 40A, 43A and 46A are set symmetrically right and left on the basis of 0. In practice, only the coefficients of black dots are used. The interpolation is performed by multiplying the delayed data by the coefficients and then adding the multiplied data. Then, the decimation is performed with respect to the interpolated data so that 240 pixels are present in the unit of line.

The output data AH1–AH3 and BH1–BH3 from the horizontal decimation circuit 6A are stored in first-in-first-out (FIFO memories 71A–76A in the memory device 7A in response to the write clock WCLK1 of 4788fh/4, respectively. In the non-interlace mode, the switch SW1 is turned on so that the data V6–V11 from the FIFO memories 71A–76A can be outputted in response to the read clock RCLK1 of 27 MHz. Then, the D/A converter 8A converts the output data V6–V11 from the memory device 7A into the analog signal at the sampling frequency Vf2 of 27 MHz. In result, the NTSC broadcasting signal with the aspect ratio of 4:3 is outputted as shown in FIG. 9K.

On the other hand, in the interlace mode, the switch SW1 is turned off so that the data V6–V11 from the FIFO memories 71–76A can be outputted in response to the read clock RCLK1 of 13.5 MHz. Then, the D/A converter 8A converts the output data V6–V11 from the memory device 7A into the analog signal at the sampling frequency Vf2 of 13.5 MHz. In result, the NTSC broadcasting signal with the aspect ratio of 4:3 is outputted as shown in FIG. 9L.

Figure 4:
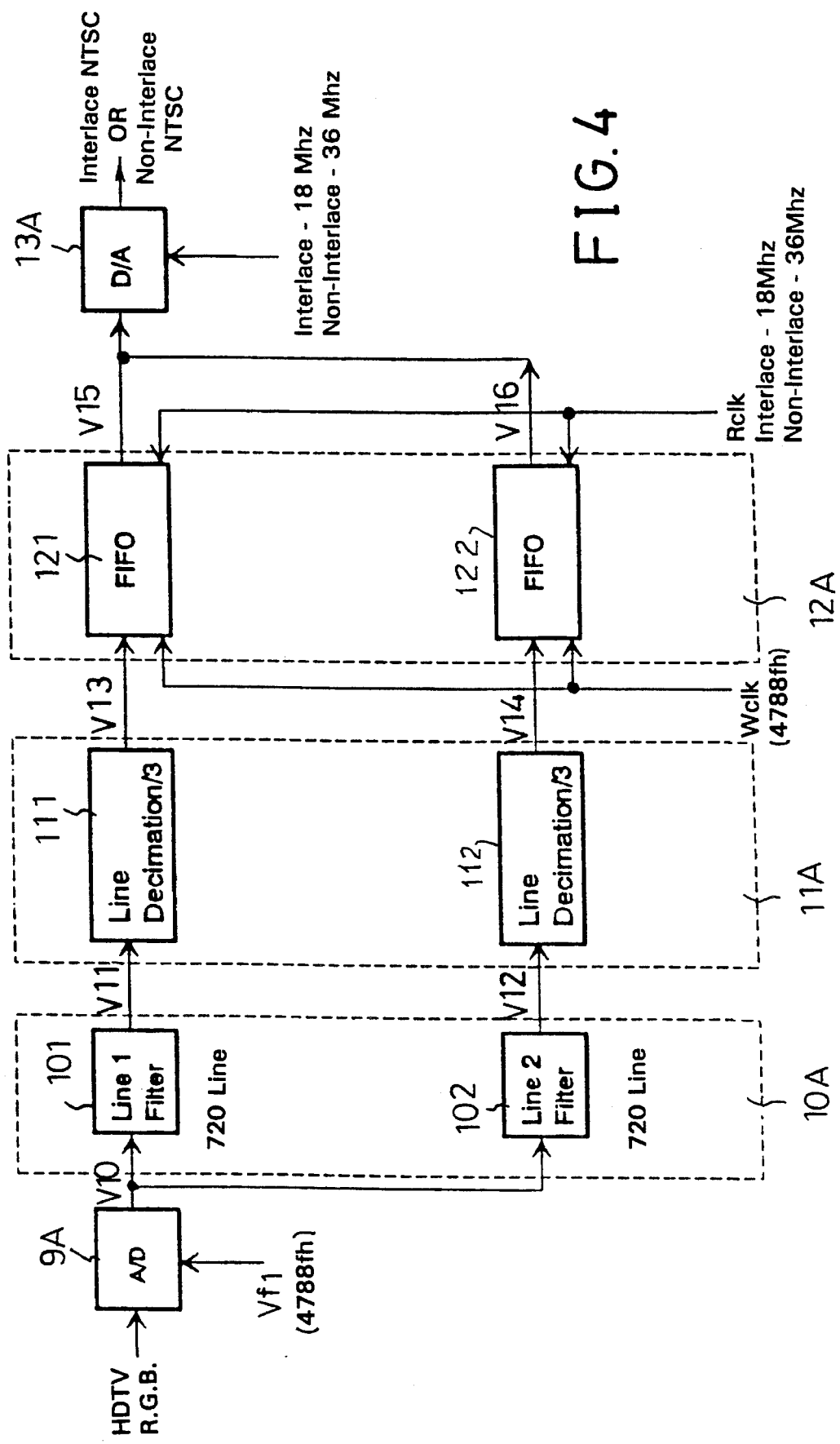
FIG. 4 is a block diagram of an alternative embodiment of the HDTV signal conversion circuit using the side cut mode in accordance with the present invention.

Referring to FIG. 4, there is shown a block diagram of an alternative embodiment of the HDTV signal conversion circuit using the side cut mode in accordance with the present invention. As shown in this drawing, the HDTV signal conversion circuit comprises an analog/digital (A/D) converter 9A for converting the HDTV signal into a digital signal V10 at a sampling frequency Vf1 (4788fh), a line filtering circuit 10A for performing a vertical interpolation of the digital signal V10 from the A/D converter 9A, a line decimation circuit 11A for performing a vertical decimation of output data V11 and V12 from the line filtering circuit 10A, a memory device 12A for storing output data V13 and V14 from the line decimation circuit 11A in response to a write clock WCLK2 and outputting the stored data in response to a read clock RCLK2, and a digital/analog (D/A) converter 13A for converting output data V15 and V16 from the memory device 12A into an analog signal at a sampling frequency Vf3.

The operation of the alternative embodiment of the HDTV signal conversion circuit with the above-mentioned construction using the side cut mode in accordance with the present invention will hereinafter be described in detail with reference to FIG. 4 and FIGS. 10A to 10F. FIGS. 10A to 10F are waveform diagrams of the output data from the components in FIG. 4.

Figure 10:
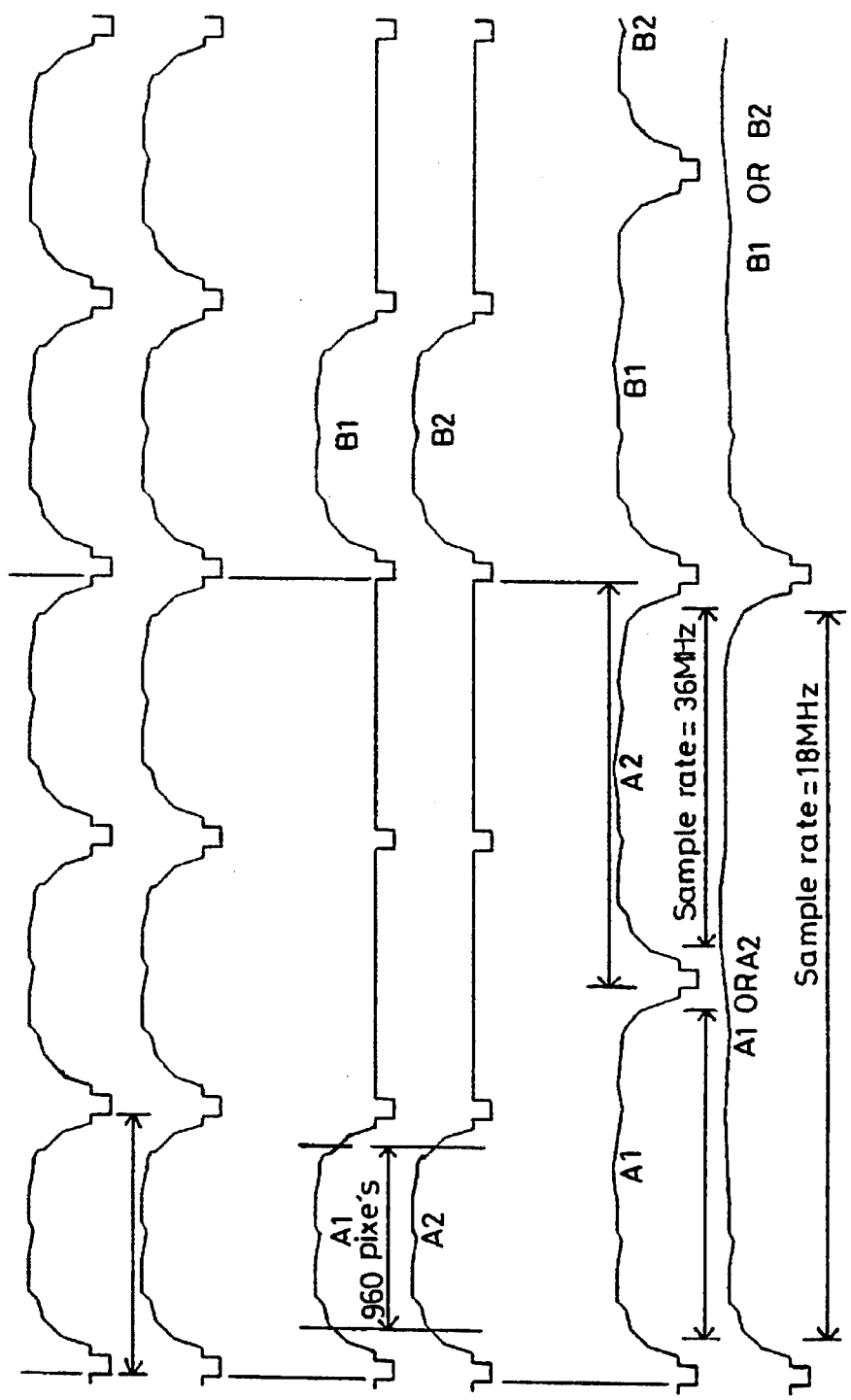
FIGS. 10A to 10F are waveform diagrams of output data from components in FIG. 4.

Upon receiving the HDTV signal, the A/D converter 9A converts the received HDTV signal into the digital signal V10 at the sampling frequency Vf1 of 4788fh (fh is the NTSC horizontal frequency). The digital signal V10 From the A/D converter 9A is applied to the line filtering circuit 10A. In the line filtering circuit 10A, the vertical interpolation is performed with respect to the digital signal V10 from the A/D converter 9A by line filters 101 and 102. As a result, each of the output data V11 and V12 from the line filters 101 and 102 has an interval of 3 H as shown in FIGS. 10A and 10B. The output data V11 and V12 from the line filters 101 and 102 are applied to the line decimation circuit 11A.

In the line decimation circuit 11A, the decimation is performed with respect to the output data V11 and V12 of 720 lines from the line filtering circuit 10A by line decimation units 111 and 112. As a result, the output data V13 and V14 from the line decimation units 111 and 112 have 960 pixels and 240 lines as shown in FIG. 10C and 10D, respectively. The output data V13 and V14 from the line decimation units 111 and 112 are applied to FIFO memories 121 and 122 in the memory device 12A at a sampling rate of 75 MHz, respectively.

Namely, the output data V13 and V14 from the line decimation circuit 11A are stored in the FIFO memories 121 and 122 in the memory device 12A in response to the write clock WCLK2 of 4788fh, respectively. In the non-interlace mode, the data V15–V16 from the FIFO memories 121 and 122 are outputted in response to the read clock RCLK2 of 36 MHz and applied to the D/A converter 13A. Then, the D/A converter 13A converts the output data V15 and V16 from the memory device 12A into the analog signal at the sampling frequency Vf3 of 36 Hz. In result, the NTSC broadcasting signal with the aspect ratio of 4:3 is outputted as shown in FIG. 10E.

On the other hand, in the interlace mode, the data V15–V16 from the FIFO memories 121 and 122 are outputted in response to the read clock RCLK2 of 18 MHz and applied to the D/A converter 13A. Then, the D/A converter 13A converts the output data V15 and V16 from the memory device 12A into the analog signal at the sampling frequency Vf3 of 18 MHz. In result, the NTSC broadcasting signal with the aspect ratio of 4:3 is outputted as shown in FIG. 10F.

Next, the conversion of the aspect ratio of the HDTV signal into that of the NTSC broadcasting signal using a letter box mode in accordance with the present invention will hereinafter be described.

Figure 11:
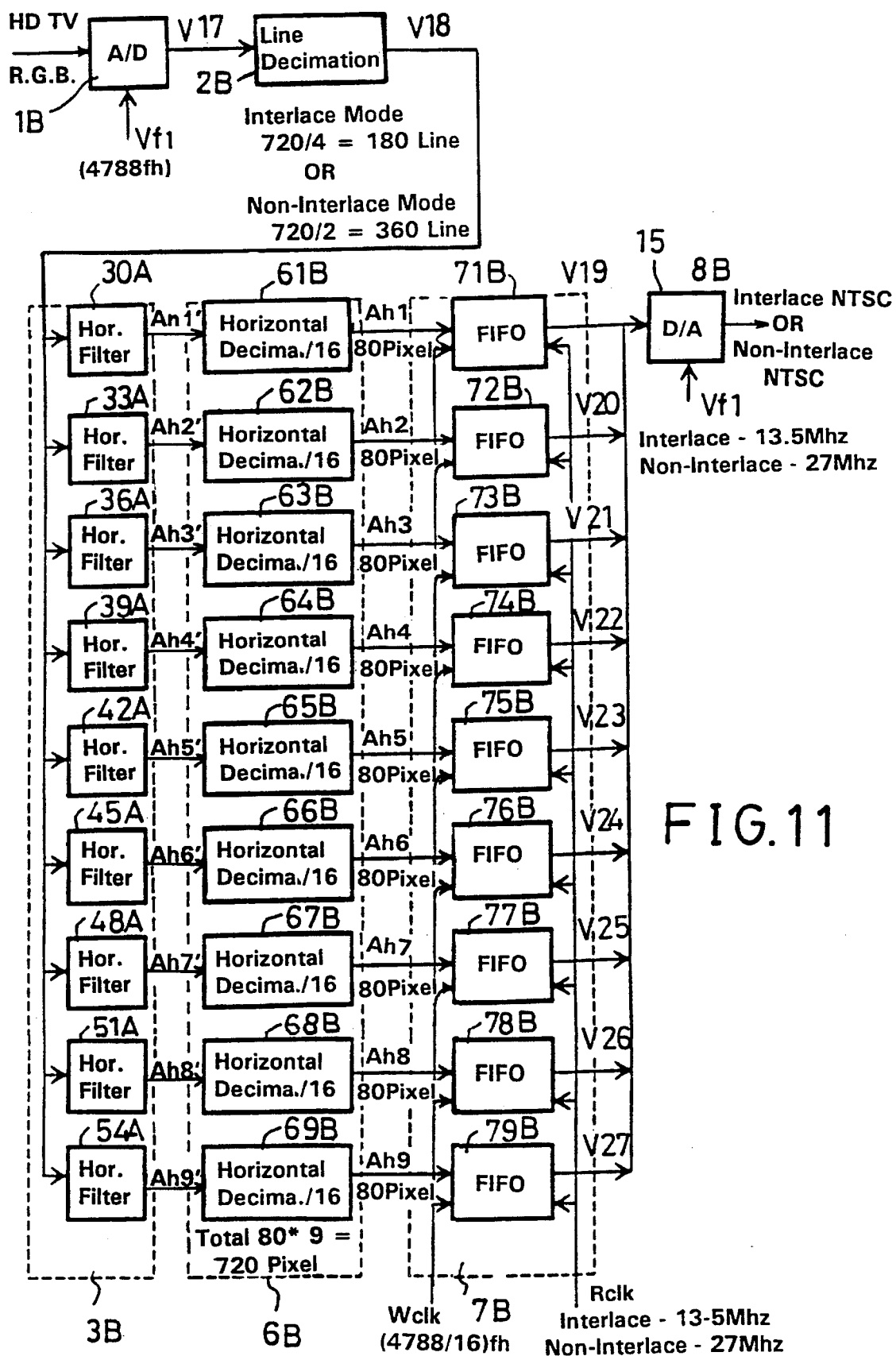
FIG. 11 is a block diagram of an embodiment of a HDTV signal conversion circuit using the letter box mode in accordance with the present invention.

Referring to FIG. 11, there is shown a block diagram of an embodiment of a HDTV signal conversion circuit using the letter box mode in accordance with the present invention. As shown in this drawing the HDTV signal conversion circuit comprises an analog/digital (A/D) converter 1B for converting the HDTV signal into a digital signal V17 at a sampling frequency Vf1, a line decimation circuit 2B for performing a vertical decimation of the digital signal V17 from the A/D converter 1B, a horizontal filtering circuit 3B for performing a horizontal interpolation of output data V18 from the line decimation circuit 2B, and a horizontal decimation circuit 6B for performing a horizontal decimation of output data Vh1–Vh9 from the horizontal filtering circuit 3B.

A memory device 7B is provided in the HDTV signal conversion circuit to store output data Ah1–Ah9 from the horizontal decimation circuit 6B in response to a write clock WCLK3 and output the stored data in response to a read clock RCLK1.

A digital/analog (D/A) converter 8B is also provided in the HDTV signal conversion circuit to convert output data V19–V27 from the memory device 7B into an analog signal at a sampling frequency Vf4.

Figure 14:
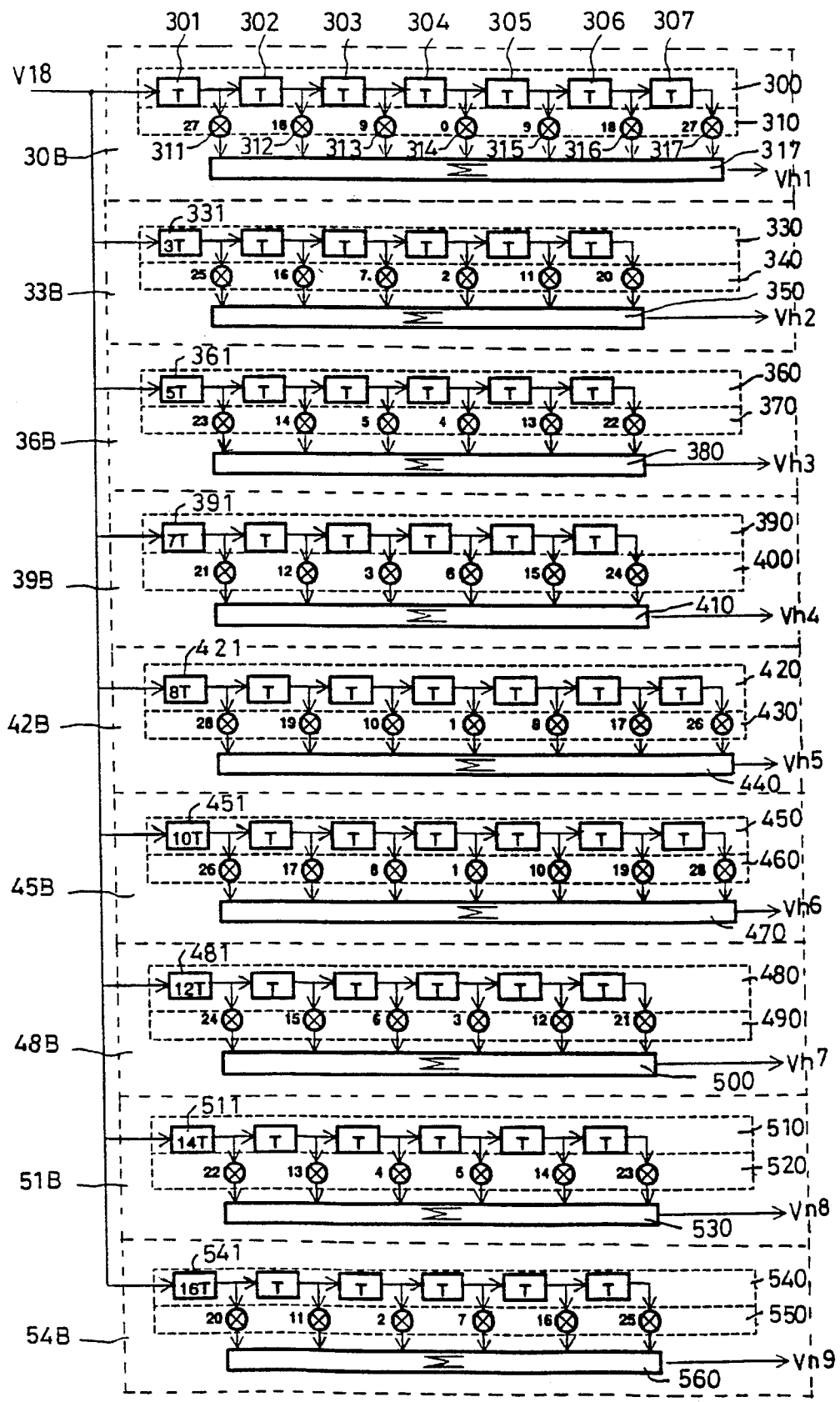
FIG. 14 is a detailed block diagram of a horizontal filtering circuit in FIG. 11 or 12.

Referring to FIG. 14, there is shown a detailed block diagram of the horizontal filtering circuit 3B in FIG. 11. As shown in this drawing, the horizontal filtering circuit 3B includes horizontal filters 30B, 33B, 36B, 39B, 42B, 45B, 48B, 51B and 54B.

The horizontal filter 30B includes a pixel delay circuit 300, a multiplication circuit 310 and an adder 320. The pixel delay circuit 300 includes a plurality of delay elements 301–307 for sequentially delaying the output data V18 from the decimation circuit 2B by one pixel. The multiplication circuit 310 is provided with a plurality of multipliers 311–317, each of which multiplies a corresponding one of output data from the delay elements 301–306 in the pixel delay circuit 300 by a coefficient. The adder 320 is adapted to add output data from the multipliers 311–317 in the multiplication circuit 310.

The horizontal filters 33B, 36B, 39B, 42B, 45B, 48B, 51B and 54B include pixel delay circuits 330, 360, 390, 420, 450, 480, 510 and 540, multiplication circuits 340, 370, 400, 430, 460, 490, 520 and 550 and adders 350, 380, 410, 440, 470, 500, 530 and 560, respectively, similarly to those in the horizontal filter 30B. However, the pixel delay circuits 330, 360, 390, 420, 450, 480, 510 and 540 have a 3-pixel delay element 331, a 5-pixel delay element 361, a 7-pixel delay element 391, an 8-pixel delay element 421, a 10-pixel delay element 451, a 12-pixel delay element 481, a 14-pixel delay element 511 and a 16-pixel delay element 541, respectively, instead of the one-pixel delay element 301 in the pixel delay circuit 300.

Figure 2:
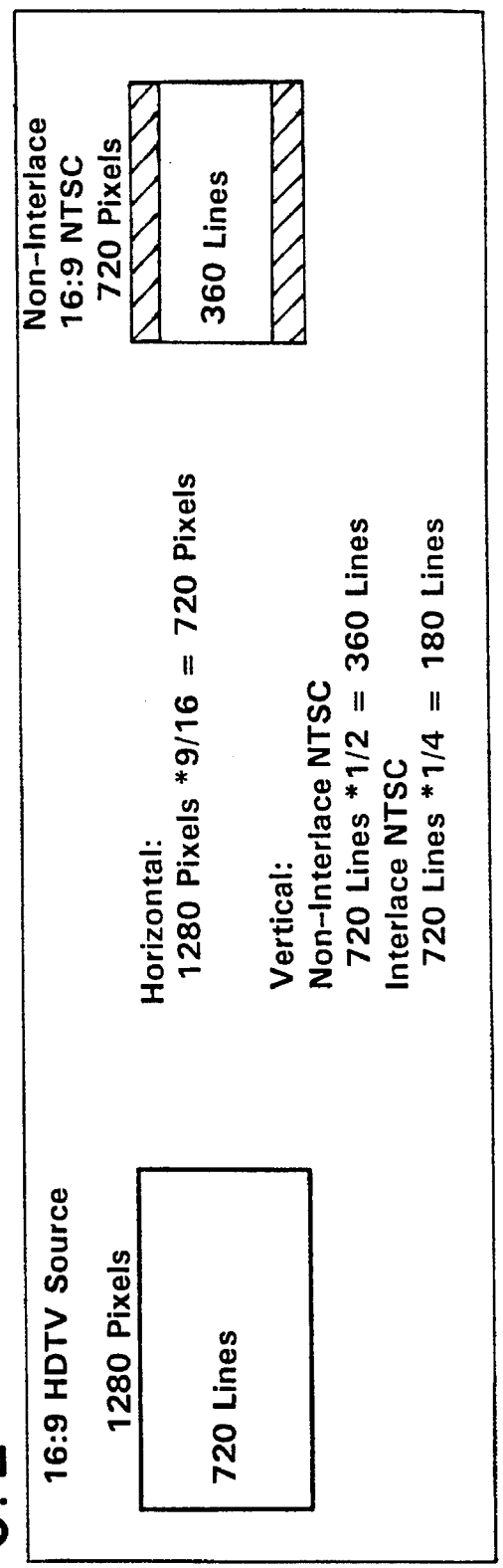
FIG. 2 is a view illustrating a screen state to which a letter box mode is applied in accordance with the present invention.
Figure 13:
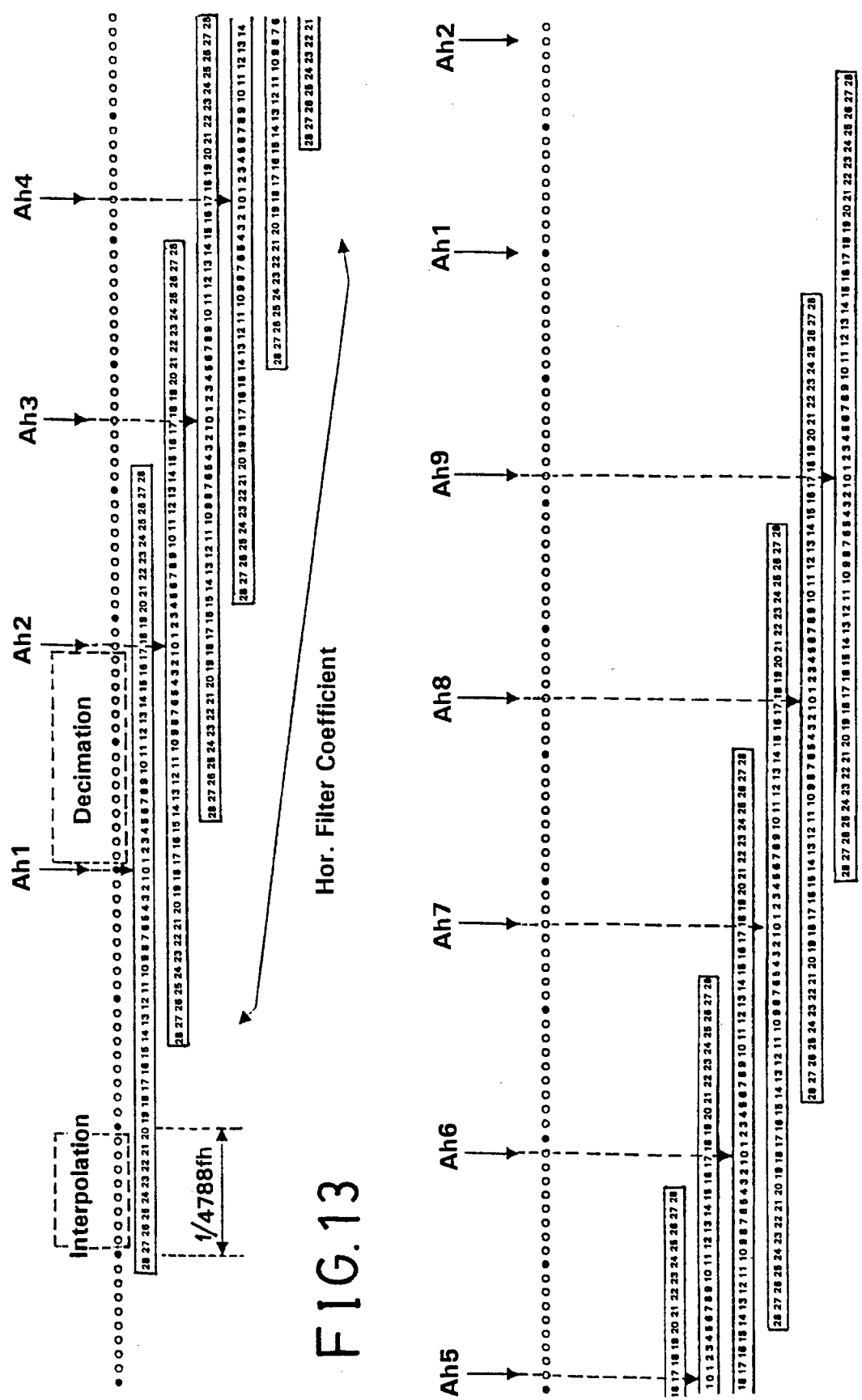
FIG. 13 is a view illustrating a state of input data in FIG. 11 or 12 to which horizontal interpolation and decimation are applied in accordance with the present invention.

The operation of the embodiment of the HDTV signal conversion circuit with the above-mentioned construction using the letter box mode in accordance with the present invention will hereinafter be described in detail with reference to FIGS. 2, 11 and 13 to 15M. FIG. 2 a view illustrating a screen state to which the letter box mode is applied in accordance with the present invention, FIG. 13 is a view illustrating a state of the input data in FIG. 11 to which the horizontal interpolation and decimation are applied in accordance with the present invention, and FIGS. 15A to 15M are waveform diagrams of the output data from the components in FIG. 11.

As shown in FIG. 2, for the purpose of the conversion of the HDTV signal with the aspect ratio of 16:9 into the NTSC broadcasting signal with the aspect ratio of 16:9, the horizontal interpolation of 9 and the decimation of 16 are performed with respect to the 1280 horizontal pixels. As a result, 720 pixels necessary to the NTSC broadcasting signal are obtained.

In the non-interlace mode, the decimation of 2 are performed with respect to the 720 vertical lines. In this case, the converted NTSC broadcasting signal has 360 vertical lines. In the interlace mode, the decimation of 4 are performed with respect to the 720 vertical lines. In this case, the converted NTSC broadcasting signal has 180 vertical lines. The obtained 360 lines correspond to 75% (480×0.75=360) of the 480 lines of the HDTV signal in the case of the NTSC broadcasting signal with the 4:3 aspect ratio.

In operation, upon receiving the HDTV signal, the A/D converter 1B converts the received HDTV signal into the digital signal V17 as shown in FIG. 15A at the sampling frequency Vf1 of 4788fh (fh is the NTSC horizontal frequency). The digital signal V17 from the A/D converter 1B is applied to the line decimation circuit 2B.

The line decimation circuit 2B performs the decimation with respect to the digital signal V17 from the A/D converter 1B so that its output data V18 can have 180 lines in the interlace mode and 360 lines in the non-interlace mode as shown in FIG. 15B. The output data V18 from the line decimation circuit 2B is applied to the horizontal filtering circuit 3B.

In the horizontal filtering circuit 3B, the output data V18 from the line decimation circuit 2B is applied to the horizontal filters 30B, 33B, 36B, 39B, 42B, 45B, 48B, 51B and 54B.

In the horizontal filter 30B, the output data V18 from the line decimation unit 2B is sequentially delayed by one pixel by the delay elements 301–307 of the pixel delay circuit 300. Then, the output data from the delay elements 301–307 in the pixel delay circuit 300 are multiplied by the coefficients by the multipliers 311–317 in the multiplication circuit 310, respectively. The adder 320 adds the output data from the multipliers 311–317 in the multiplication circuit 310 and outputs the resultant data Vh1.

In the horizontal filter 33S, the output data V18 from the line decimation circuit 25 is delayed by two pixels by the delay element 331 in the pixel delay circuit 330 and then sequentially delayed by one pixel by the remaining delay elements in the pixel delay circuit 330. Then, the output data from the pixel delay circuit 330 are multiplied by the coefficients by the multiplication circuit 340, respectively. The adder 380 adds the output data from the multiplication circuit 340 and then outputs the resultant data Vh2. In a similar manner to that of the horizontal filter 33B, in the horizontal filters 36B, 39B, 42B, 45B, 48B, 51B and 54B, the pixel delay circuits 360, 390, 420, 450, 480, 510 and 540 delay the output data V18 from the line decimation circuit 2B by 3 pixels, 5 pixels, 7 pixels, 8 pixels, 10 pixels, 12 pixels, 14 pixels and 16 pixel and then delay the delayed data sequentially by one pixel, respectively. The output data from the pixel delay circuits 360, 390, 420, 450, 480, 510 and 540 are multiplied by the coefficients by the multiplication circuits 370, 400, 430, 460, 490, 520 and 550 and then added by the adders 380, 410, 440, 470, 500, 530 and 560, respectively. As a result, the horizontal filters 36B, 39B, 42B, 45B, 48B, 51B and 54B output the interpolated data Vh3–Vh9, respectively. The output data Vh1–Vh9 from the horizontal filters 30B, 33B, 36B, 39B, 42B, 45B, 48B, 51B and 54B are applied to the horizontal decimation circuit 6B.

In the horizontal decimation circuit 6A, the decimation is performed with respect to the output data Vh1–Vh9 from the horizontal filtering circuit 3B by horizontal decimation units 61B–69B. As a result of the decimation, the horizontal decimation units 61A–69B output the data Ah1–Ah9 as shown in FIGS. 15C to 15K to the memory device 7B at a sampling rate of 75/16 MHz.

For example, assume that the horizontal interpolation of 9 and the decimation of 16 are performed under the condition of 57 filter coefficients. In FIG. 13, the horizontal interpolation of 9 is performed with respect to data of black dots by the coefficients of the horizontal filtering circuit 3B. As a result, pixels of white dots are outputted from the horizontal filtering circuit 3B. Then, the decimation of 16 is performed with respect to the interpolated output data Vh1–Vh9 from the horizontal filtering circuit 3B by the horizontal decimation circuit 6B. As a result of the decimation, the data Ah1–Ah9 of 80 pixels are repeatedly outputted The output data Ah1–Ah9 From the horizontal decimation circuit 6B are stored in first-in-first-out (FIFO) memories 71B–79B in the memory device 7B in response to the write clock WCLK3 of (4788/16) fh, respectively. In the non-interlace mode, the data V19–V27 from the FIFO memories 71B–79B are sequentially outputted in response to the read clock RCLK1 of 27 MHz. Then, the D/A converter 8B converts the output data V19–V27 from the memory device 7B into the analog signal at the sampling frequency Vf4 of 27 MHz. In result, the NTSC broadcasting signal with the aspect ratio of 16:9 is outputted as shown in FIG. 15L.

On the other hand, in the interlace mode, the data V19–V27 from the FIFO memories 71B–79B are outputted in response to the read clock RCLK1 of 13.5 MHz. Then, the D/A converter 8B converts the output data V19–V27 from the memory device 7B into the analog signal at the sampling frequency Vf4 of 13.5 MHz. In result, the NTSC broadcasting signal with the aspect ratio of 16:9 is outputted as shown in FIG. 15M.

Figure 12:
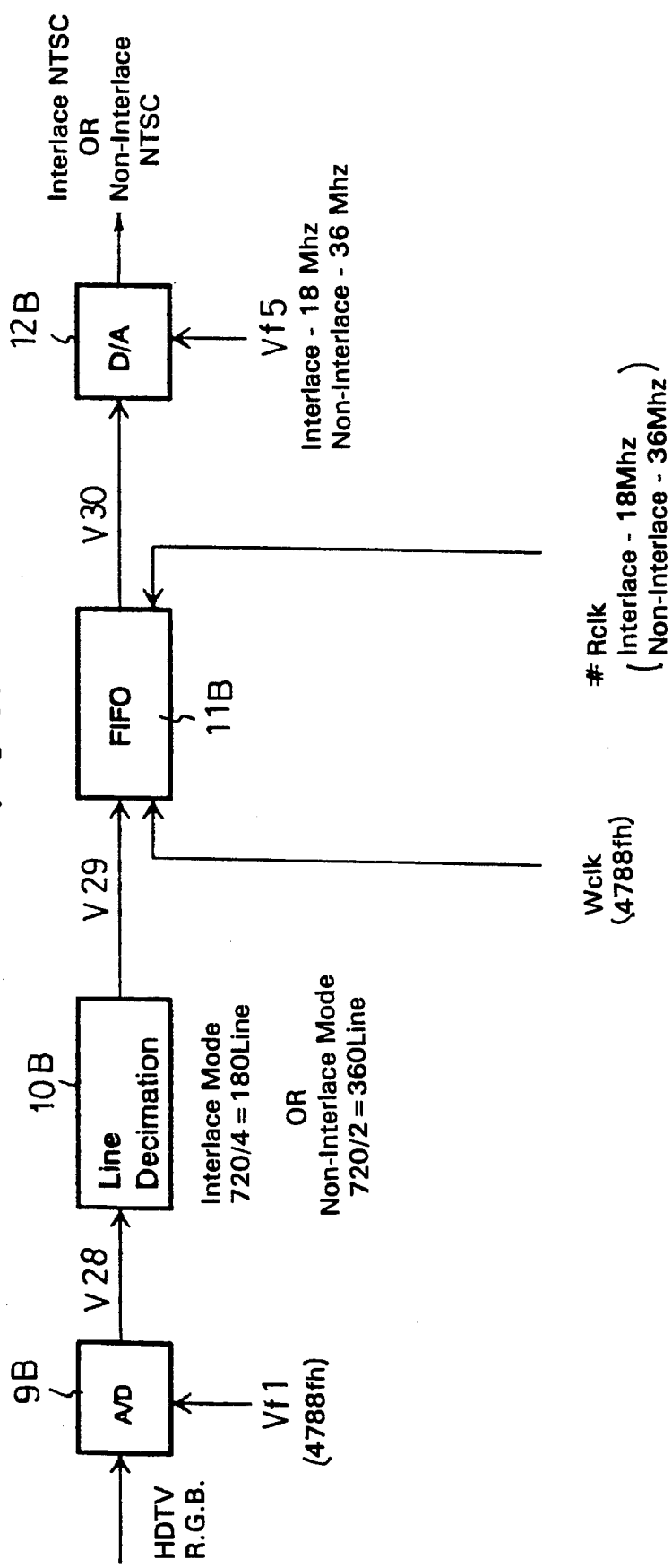
FIG. 12 is a block diagram of an alternative embodiment of the HDTV signal conversion circuit using the letter box mode in accordance with the present invention.

Referring to FIG. 12, there is shown a block diagram of an alternative embodiment of the HDTV signal conversion circuit using the letter box mode in accordance with the present invention. As shown in this drawing, the HDTV signal conversion circuit comprises an analog/digital (A/D) converter 9B for converting the HDTV signal into a digital signal V28 at a sampling frequency Vf1, a line decimation circuit 10B for performing a vertical decimation of the digital signal V28 from the A/D converter 9B according to the interlace mode or the non-interlace mode, a memory device 11B for storing output data V29 from the line decimation circuit 10B in response to a write clock WCLK2 and outputting the stored data in response to a read clock RCLK3, and a digital/analog (D/A) converter 12B for converting output data V30 from the memory device 11B into an analog signal at a sampling frequency Vf5.

The operation of the alternative embodiment of the HDTV signal conversion circuit with the above-mentioned construction using the letter box mode in accordance with the present invention will hereinafter be described in detail with reference to FIG. 12 and FIGS. 16A to 16D. FIGS. 16A to 16D are waveform diagrams of the output data from the components in FIG. 12.

Figure 16A:
FIGS. 16A to 16D are waveform diagrams of output data from components in FIG. 12.

Upon receiving the HDTV signal, the A/D converter 9B converts the received HDTV signal into the digital signal V28 of 720 lines as shown in FIG. 16A at the sampling frequency Vf1 of 4788fh (fh is the NTSC horizontal frequency). As shown in FIG. 16A, the digital signal V28 from the A/D converter 9B has an interval of 3 H The digital signal V28 from the A/D converter 9B is applied to the line decimation circuit 10B.

Figure 16B:
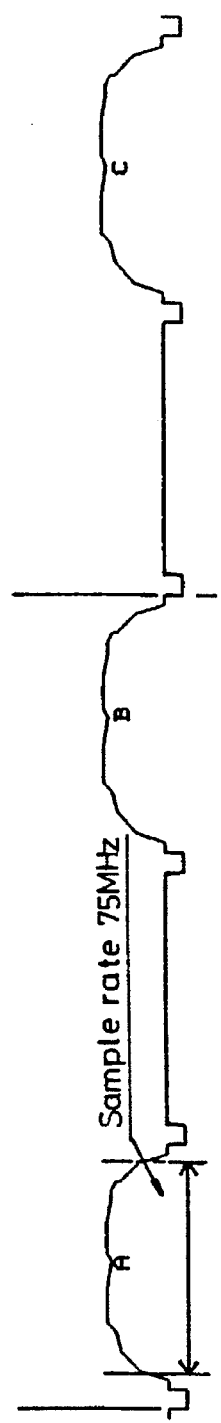

In the line decimation circuit 10B, the decimation of 4 is performed with respect to the digital signal V28 from the A/D converter 96 so that the output data V29 can have 180 lines in the interlace mode. Also, in the non-interlace mode, the decimation of 2 is performed with respect to the digital signal V28 from the A/D converter 96 so that the output data V29 can have 1280 pixels and 360 lines as shown in FIG. 16B. The output data V29 from the line decimation circuit 10B is applied to the memory device lib at a sampling rate of 75 MHz.

Figure 16C:
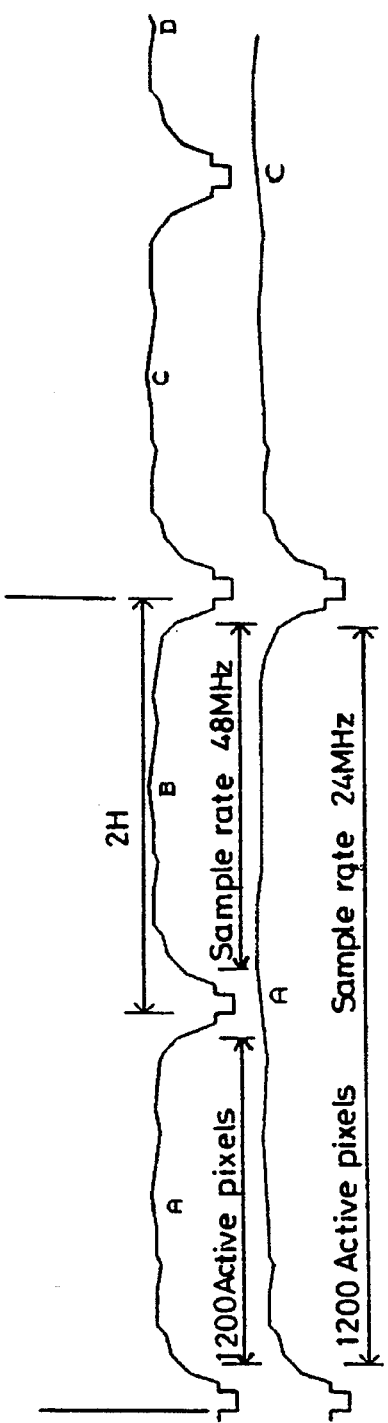

The output data V29 from the line decimation circuit 10B is stored in the memory device 11B in response to the write clock WCLK2 of 4788fh. In the non-interlace mode, the data V30 from the memory device 11b is outputted in response to the read clock RCLK3 of 18 MHz. Then, the D/A converter 126 converts the output data V30 from the memory device 11B into the analog signal at the sampling frequency Vf5 of 48 MHz. In result, the NTSC broadcasting signal with the aspect ratio of 16:9 is outputted as shown in FIG. 16C.

Figure 16D:

On the other hand, in the interlace mode, the data V30 from the memory device 11B is outputted in response to the read clock RCLK3 of 24 MHz. Then, the D/A converter 12B converts the output data V30 from the memory device 11B into the analog signal at the sampling frequency Vf5 of 24 MHz. In result, the NTSC broadcasting signal with the aspect ratio of 16:9 is outputted as shown in FIG. 16D. In this case, the converted NTSC broadcasting signal has an interval of 4 H.

Although the data between the lines or the pixels has been used to make the construction of the horizontal filters simple, the data between the lines, the pixels or fields may be used for the same purpose. Namely, the construction of the horizontal filters may be changed according to a motion level detected on the basis of the data between the lines, the pixels or fields. Also, the reduction in the number of the filter coefficients has the effect of making the hardware construction simple.

As apparent from the above description, according to the present invention, the HDTV signal is converted into the existing NTSC broadcasting signal by the interpolation and decimation. Therefore, the user can watch and record the HDTV broadcasting with no use of a separate HDTV system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high definition television signal conversion circuit using a letter box mode, comprising:

analog/digital conversion means for converting a high definition television signal into a digital signal at a first sampling frequency;

line decimation means for performing a vertical decimation of output data from said analog/digital conversion means according to a scanning mode to delete lines;

horizontal filtering means having a number of horizontal filters equal to a number of an interpolation, for delaying sequentially output data from said line decimation means to perform a horizontal interpolation of the output data from said line decimation means;

horizontal decimation means having a number of horizontal decimation units equal to the number of said horizontal filters, each horizontal decimation unit performing a horizontal decimation of output data from a corresponding one of said horizonal filters;

memory means having a number of memories equal to the number of said decimation units, each memory storing output data from said horizontal decimation means in response to a first write clock and outputting the stored data in response to a first read clock, said first read clock being determined according to the scanning mode; and first digital/analog conversion means for converting output data from said first memory means into an analog signal at a second sampling frequency, said second sampling frequency being determined according to the scanning mode.

2. A circuit as set forth in claim 1, wherein the number of said horizontal filters is 9.

3. A circuit as set forth in claim 1, wherein said horizontal decimation means performs the decimation of 16.

* * * * *